UNITED STATES PATENT OFFICE.

CHARLES H. W. SCHAMBACH, OF NEVADA, MISSOURI.

INSECTICIDE.

SPECIFICATION forming part of Letters Patent No. 659,552, dated October 9, 1900.

Application filed August 2, 1900. Serial No. 25,688. (No specimens.)

*To all whom it may concern:*

Be it known that I, CHARLES H. W. SCHAMBACH, a citizen of the United States, residing at Nevada, in the county of Vernon and State of Missouri, have invented new and useful Improvements in Compositions of Matter, of which the following is a specification.

My invention relates to improvements in compositions of matter for invigorating or toning up plants and trees and destroying insects.

It contemplates the provision of a composition which, in addition to invigorating plants and trees and destroying insects, is calculated to keep the bark of trees in a smooth healthy condition and prevent scaling of the same, and also prevent rabbits and other animals from gnawing the trees.

My composition consists of the following ingredients combined in the proportions stated—viz., soap-lye, fifty per cent.; sulphur twenty per cent.; pine-tar, ten per cent.; chenopodium, ten per cent.; carbolic acid, two per cent.; lime, eight per cent. These ingredients are to be thoroughly mingled by agitation.

When the composition is to be used as a wash for trees or plants, the same is mixed with water in the proportions of one pound of composition to four pounds of water, while when it is to be used as a spray the proportions are preferably one pound of composition to five pounds of water. Experience has demonstrated that ten pounds of the composition mixed with water, as stated, will wash one hundred trees of ordinary size.

The soap-lye of the composition serves to cleanse plants and trees and also to remove rough bark from the latter, leaving them smooth, with no place for insects to deposit their eggs. Sulphur in the proportion stated is calculated to invigorate and tone up both trees and plants, and carbolic acid and lime in the proportions stated are adapted to open up the pores and let sulphur into a tree or plant, so as to enable it to kill the insects therein, while the pine-tar and chenopodium in about the proportions stated are adapted to prevent rabbits or other animals from gnawing trees or plants and destroying the same. When my improved composition is to be used in localities not infested with rabbits and similar animals, it is obvious that the pine-tar and chenopodium may be omitted without departing from the scope of my invention.

In addition to serving the purposes before stated my improved composition as a whole is an efficient fertilizer, and hence is calculated to materially accelerate the growth of both plants and trees.

Having described my invention, what I claim, and desire to secure by Letters Patent, is—

1. The herein-described composition of matter, consisting of soap-lye, sulphur, carbolic acid, and lime, substantially as described and for the purpose specified.

2. The herein-described composition of matter, consisting of soap-lye, sulphur, pine-tar, chenopodium, carbolic acid, and lime, substantially as described, and for the purpose specified.

3. The herein-described composition of matter for destroying insects and invigorating trees and plants and preserving the same against insects and rabbits and other animals, consisting of soap-lye fifty per cent., sulphur twenty per cent., pine-tar ten per cent., chenopodium ten per cent., carbolic acid two per cent., and lime eight per cent., substantially as described.

In testimony whereof I have hereunto set my hand in presence of two subscribing witnesses.

CHARLES H. W. SCHAMBACH.

Witnesses:
J. H. BEAN,
J. C. LIGHT.